(12) United States Patent
Kato (10) Patent No.: US 6,783,166 B2
(45) Date of Patent: Aug. 31, 2004

(54) GUIDE MECHANISM, OPENING-CLOSING MECHANISM OF COVERING MEMBER USING THE GUIDE MECHANISM AND INTERIOR EQUIPMENT FOR AUTOMOBILE USING THE OPENING-CLOSING MECHANISM

(75) Inventor: Masakatsu Kato, Tokyo (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/370,742

(22) Filed: Feb. 24, 2003

(65) Prior Publication Data

US 2003/0178434 A1 Sep. 25, 2003

(30) Foreign Application Priority Data

Mar. 25, 2002 (JP) ........................................ 2002-082920

(51) Int. Cl.⁷ .................................................. B60N 3/12
(52) U.S. Cl. .................. 296/37.12; 296/37.8; 296/37.1; 296/37.9
(58) Field of Search ............................ 296/37.12, 37.8, 296/37.1, 146.8, 56, 106; 16/355; 472/103; 409/134; 52/481.2; 160/133; 280/804

(56) References Cited

U.S. PATENT DOCUMENTS

| | | | | |
|---|---|---|---|---|
| 4,296,944 A | * | 10/1981 | Matsuoka et al. | .......... 280/804 |
| 4,341,253 A | * | 7/1982 | Eyerle | ......................... 160/133 |
| 4,388,790 A | * | 6/1983 | Greco | ........................ 52/481.2 |
| 4,392,683 A | * | 7/1983 | Bassi | ......................... 296/37.9 |
| 4,449,870 A | * | 5/1984 | Suzuki | ........................ 409/134 |
| 4,518,194 A | * | 5/1985 | Kirkham et al. | ........ 296/100.18 |
| 4,596,416 A | * | 6/1986 | Muller | ...................... 296/37.12 |
| 4,712,845 A | * | 12/1987 | Nicol | ......................... 296/37.9 |
| 5,460,309 A | * | 10/1995 | Nehl et al. | ................ 296/37.12 |
| 5,522,772 A | * | 6/1996 | Chenard et al. | ............. 472/103 |
| 5,887,930 A | * | 3/1999 | Klein | ....................... 296/37.12 |
| 5,971,463 A | * | 10/1999 | Nowak et al. | .............. 296/37.8 |
| 6,129,401 A | * | 10/2000 | Neag et al. | ................. 296/37.1 |
| 6,131,242 A | * | 10/2000 | Zipperle et al. | ............ 296/37.8 |
| 6,213,533 B1 | * | 4/2001 | Widulle et al. | ........... 296/37.12 |
| 6,295,883 B1 | * | 10/2001 | Tsukada et al. | ............ 296/37.12 |
| 6,629,716 B2 | * | 10/2003 | Shibata et al. | .............. 296/37.8 |
| 6,634,690 B2 | * | 10/2003 | Schaal | ......................... 296/37.8 |
| 6,662,405 B2 | * | 12/2003 | Vitry | ............................. 16/355 |
| 6,669,258 B1 | * | 12/2003 | Kato | ........................ 296/37.12 |
| 6,669,260 B2 | * | 12/2003 | Clark et al. | ................. 296/37.8 |
| 6,715,815 B2 | * | 4/2004 | Toppani | ................... 296/37.12 |
| 2003/0080131 A1 | * | 5/2003 | Fukuo | ...................... 296/37.12 |

* cited by examiner

Primary Examiner—Kiran Patel (57) ABSTRACT

A guide mechanism includes a moving member supported by a supporting base frame and moving along a predetermined path with respect to the supporting base frame. A guide projection provided in the moving member is inserted in a guide groove provided in the supporting base frame and moves through the guide groove for guiding the moving member along the path. The guide groove is formed of a pair of thin wall members disposed with a predetermined space therebetween. When the guide projection is in the guide groove, a front end of the guide projection does not contact a bottom surface of the guide groove, and the guide projection slides in a state that a base surface of the guide projection linearly contacts edges of the thin wall members constituting the guide groove.

7 Claims, 7 Drawing Sheets

GUIDE MECHANISM, OPENING-CLOSING MECHANISM OF COVERING MEMBER USING THE GUIDE MECHANISM AND INTERIOR EQUIPMENT FOR AUTOMOBILE USING THE OPENING-CLOSING MECHANISM

BACKGROUND OF THE INVENTION AND RELATED ART STATEMENT

The invention relates to a guide mechanism, an opening-closing mechanism of a covering member using the guide mechanism, and an interior equipment to be installed in a car using the opening-closing mechanism for securely and smoothly guiding an object to move along a predetermined path supported by a predetermined supporting base frame. The object includes a covering member for opening or closing an opening portion of various things or materials, interior equipment to be installed in a car, and various articles to be used by drawing out of a housing portion.

Conventionally, an interior equipment such as a cup-holder, an ashtray, and various types of glove compartment is installed in an instrument panel of an automobile. Also recently, a liquid crystal display panel of a car navigation system may be installed. In this case, a covering member is usually attached to the ashtray or the various types of the glove compartment. The covering member for protection may also be attached to the liquid crystal display panel of the car navigation system, as it is preferred that the panel is protected with the covering member when the system is not used.

In this case, when the covering member is opened and the glove compartment and the car navigation system are used, the opened covering member sometimes becomes an obstacle. Especially in the case of the liquid crystal display panel of the car navigation system, the covering member may block the display panel. Additionally, the liquid crystal display panel of the car navigation system is used in a state that the covering member is opened for a long time, so that it is preferred that the opened covering member is stored into the instrument panel. Further, the cup holder is generally housed in the instrument panel, and the cup holder is drawn out of the instrument panel when used. As for the various ashtrays and grove compartments, they are drawn out of the instrument panel in the same manner when used.

In the opening-closing operation mechanism of the above-stated covering members and the drawing operation mechanism of the glove compartment, ashtray, cup holder or the like, the covering member or the like is guided along a predetermined path by inserting guide projections provided in an object to slide in guide grooves provided in a supporting base frame.

Figure 7A:
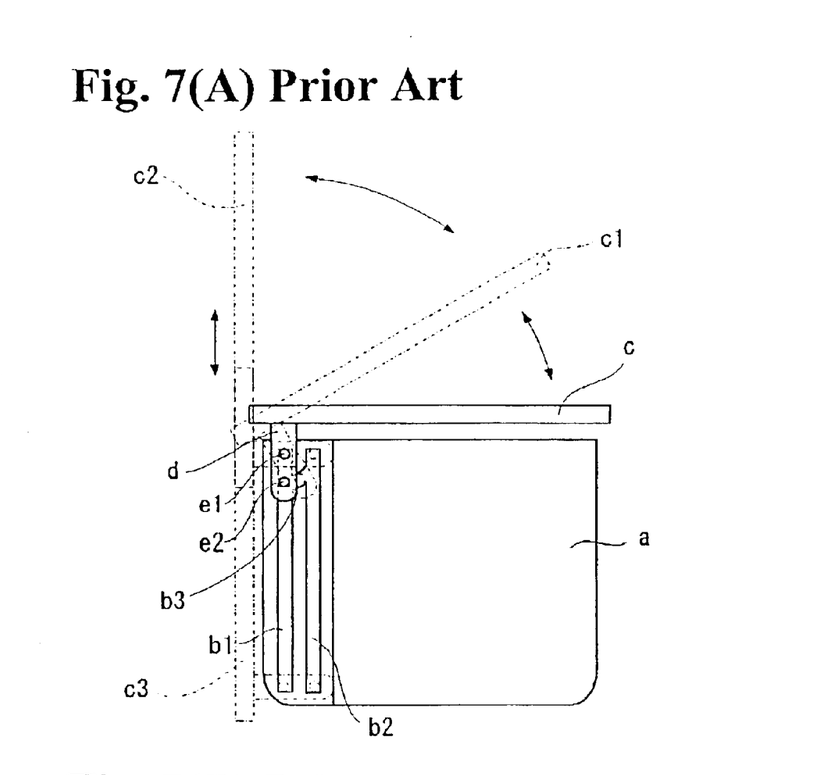
FIG. 7(A) is a schematic view for explaining an operation of the guide mechanism.
Figure 7B:
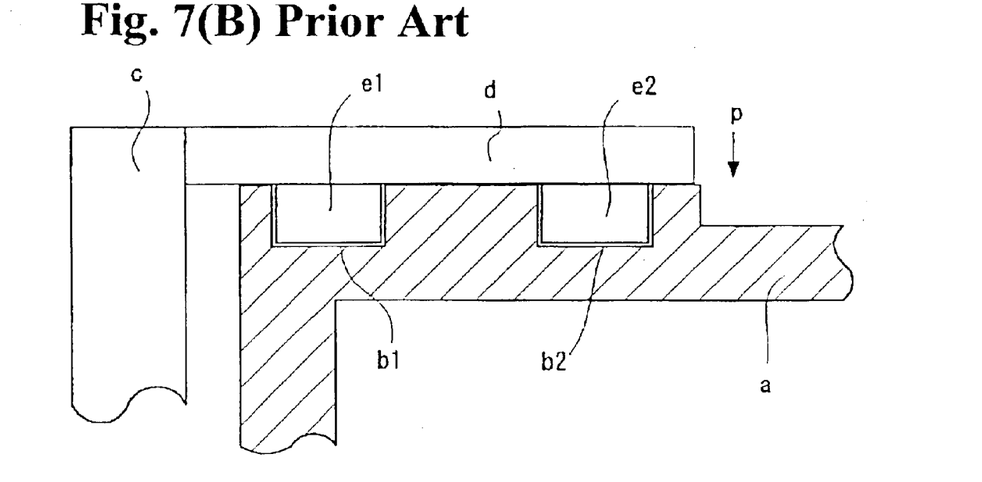
FIG. 7(B) is a sectional view showing a relationship between a guide projection and a guide groove constituting the guide mechanism.

For example, in Japanese Patent Publication (KOKAI) No. 11-20552, as shown in FIGS. 7(A) and 7(B), a guide mechanism for guiding the opening-closing operation of a covering member c of a central console box has been disclosed. In the guide mechanism, the covering member c is guided to turn and slide in a vertical direction at the opening-direction rotation limit by inserting guide projections e1, e2 into guide grooves b1, b2 to slide therethrough, so that the covering member c is opened or closed and the opened covering member c is housed in the central console box.

More specifically, in the guide mechanism shown in FIGS. 7(A) and 7(B), two guide grooves b1, b2 are formed parallel to a vertical direction on both side surfaces of a box-type main frame a, and a circular arc connecting groove b3 for connecting both guide grooves b1, b2 is formed at upper portions of both guide grooves b1, b2. Tongue shaped holding members d are provided at both side edges of one end of the covering member c, respectively, and two guide projections e1, e2 are provided in the respective holding members d. The guide projections e1, e2 are inserted into the guide grooves b1, b2 to slide, thereby attaching the covering member c to the box-type main frame a.

In the guide mechanism, as shown in FIG. 7(A), the covering member c is in a closed state where both guide projections e1, e2 are positioned in one guide groove b1. When the covering member c is opened, as shown by a dot line c1 in FIG. 7(A), the covering member c is rotated around the guide projection e1 so that the front end of the covering member c is lifted. At this time, when the other guide projection e2 enters the connecting groove b3 and then the covering member c is rotated to be located in the substantially vertical direction, as shown by a dot line c2 in FIG. 7(A), the opening of the box-type main frame a is completely opened. At this time, the other guide projection e2 is moved to the upper end of the other guide groove b2, so that both guide projections e1, e2 are positioned in the guide grooves b1, b2, respectively. Then, when the covering member c is pressed downward, both guide projections e1, e2 slide downward through both guide grooves b1, b2, respectively, and the covering member c slides downward along one side surface of the box-type main frame to be housed, as shown by a dot line c3.

Also, in case that the covering member c is closed from the state as shown by the dot line c3, both guide projections e1, e2 slide upward through both guide grooves b1, b2 by lifting the covering member c, so that the covering member c is drawn upward as shown by the dot line c2. When both guide projections e1, e2 reach the upper ends of the both guide grooves b1, b2, respectively, the covering member c is rotated around one guide projection e1 in the closing direction. At this time, the other guide projection e2 enters the connecting groove b3 from the guide groove b2, and is moved to the guide groove b1 through the connecting groove b3, so that the covering member c is completely closed as shown by a solid line as shown in FIG. 7(A). At this time, both guide projections e1, e2 are positioned in one guide groove b1.

However, this conventional opening-closing mechanism tends to wobble, or create large sliding resistance, thereby making it difficult to open the covering member c smoothly.

In other words, as described above, when the covering member c is guided along a predetermined path by sliding the guide projections e1, e2 in the guide grooves b1, b2, generally a guide mechanism includes guide grooves b1, b2 corresponding to a desired operation path formed on the box-type main frame a as a supporting base frame and the guide projections e1, e2 inserted therein as shown in FIG. 7(B). In this case, in order to smoothly slide the guide projections e1, e2, front ends of the guide projections e1, e2 are arranged not to contact bottom surfaces of the guide grooves b1, b2. Further, diameters of the guide projections e1, e2 are set to be slightly smaller than widths of the guide grooves b1, b2.

At this time, due to a dimensional accuracy, a space between the holding members d (only one holding member is shown in the drawing) disposed to hold the box-type main frame a does not always precisely match to a width of the box-type main frame a. A state that the holding member d is closely attached to the box-type main frame a is shown in FIG. 7(B). However, a space is often made between an inner surface of the holding member d and an outer surface of the box-type main frame a. In addition, since there is a clearance between the guide projections e1, e2 and the guide grooves b1, b2, the covering member c tends to wobble, thereby making the operation unstable.

In this case, to prevent the wobbling of the covering member c, a space between the holding members d is set slightly narrow so that the holding members d are slightly elastically deformed. Accordingly, as shown in FIG. 7(B), the holding members d are pressed against both side surfaces of the box-type main frame a provided with the guide grooves b1, b2, with a predetermined pressure p to thereby prevent the wobbling of the covering member c. However, in this case, the frictional resistance between both side surfaces of the box-type main frame a and the holding members becomes large, thereby making it difficult to move the covering member c smoothly.

In the conventional mechanism described above, the object (in this case the covering member c) moves in a complex manner such as rotating and sliding. Therefore, the wobble and the sliding resistance tend to be factors of preventing the smooth operation. In a case that the object (the covering member c) is automatically operated with a spring or the like, the wobble and the sliding resistance cause poor operations of the covering member c.

In view of the above defects, the present invention has been made, and an object of the invention is to provide a guide mechanism, an opening-closing mechanism of a covering member using the guide mechanism and an interior equipment to be installed in a car using the opening-closing mechanism, for securely and smoothly guiding an object supported by a supporting base frame to move along a predetermined path.

Further objects and advantages of the invention will be apparent from the following description of the invention.

SUMMARY OF THE INVENTION

In order to attain the above objects, in the present invention, in case that a moving member supported by a supporting base frame moves along a predetermined path with respect to the supporting base frame, a guide projection provided in the moving member is inserted in a guide groove provided in the supporting base frame and moves through the guide groove for guiding the moving member along the path. The guide groove is formed of a pair of thin wall members disposed with a predetermined space therebetween at a predetermined position of the supporting base frame. When the guide projection is in the guide groove, a front end of the guide projection does not contact a bottom surface of the guide groove, and the guide projection slides in a state that a base surface of the guide projection linearly contacts edges of the thin wall members constituting the guide groove.

That is, in the guide mechanism according to the present invention, the guide groove, through which the guide projection provided in the moving member slides, is formed of the pair of the thin wall members with a predetermined space therebetween on the supporting base frame. Accordingly, the space between the thin wall members becomes the guide groove. Thus, the base surface provided with the guide projection linearly contacts the edges of the thin wall members, so that the moving member can slide smoothly with a small sliding resistance.

Therefore, in order to prevent the wobbling of the moving member, even if a holding member provided with the guide projection is pressed against the supporting base frame provided with the guide grooves, the moving member can be smoothly guided without increasing the sliding resistance. Further, when the base surface provided with the guide projection is made of a material with a low sliding resistance, such as a fluorine resin, the friction can be more effectively reduced to thereby operate the moving member more smoothly.

Also, in addition to the guide mechanism, the present invention provides the following devices, i.e., an opening-closing mechanism using the guide mechanism and an interior equipment to be installed in a car using the opening-closing mechanism.

Namely, the invention includes the opening-closing mechanism wherein a sliding operation and a rotation operation of the covering member are guided by the guide mechanism of the invention described above. The opening-closing mechanism is provided in the supporting base frame having an opening portion to thereby open or close the opening portion thereof. The invention also includes an interior equipment to be installed in a car having a covering member for opening or closing an opening surface of a box-shape main frame, wherein the opening-closing operations of the covering member are guided by the guide mechanism of the present invention described above.

BRIEF DESCRIPTION OF THE DRAWINGS

FIGS. 7(A), 7(B) are schematic views showing a conventional guide mechanism for opening or closing a lid, wherein

DETAILED DESCRIPTION OF PREFERRED EMBODIMENTS

Hereunder, embodiments of the present invention will be explained with reference to the accompanying drawings. FIGS. 1–4 show an interior equipment in a car in which an opening-closing mechanism using a guiding mechanism according to the present invention guides a covering member (a moving member) 2 to open and close an opening of a box-type main frame (a supporting main frame) 1. The interior equipment is installed in the car such that the box-type main frame 1 is incorporated into an instrumental panel i of the car, and then a liquid crystal display panel of a car navigation system, for example, is disposed in the box-type main frame 1.

The box-type main frame 1 includes a curved front surface having an opening, and an upper wall and upper portions of both side surfaces extending backward to thereby form a box shape. Elongated plate attaching members 11 formed in a substantially zigzag shape project at the front ends of both sides of the main frame. By fixing the screws (not shown) into the screw holes 111 provided in the attaching members 11, the box-type main frame 1 is fixed inside the instrument panel i.

Figure 1:
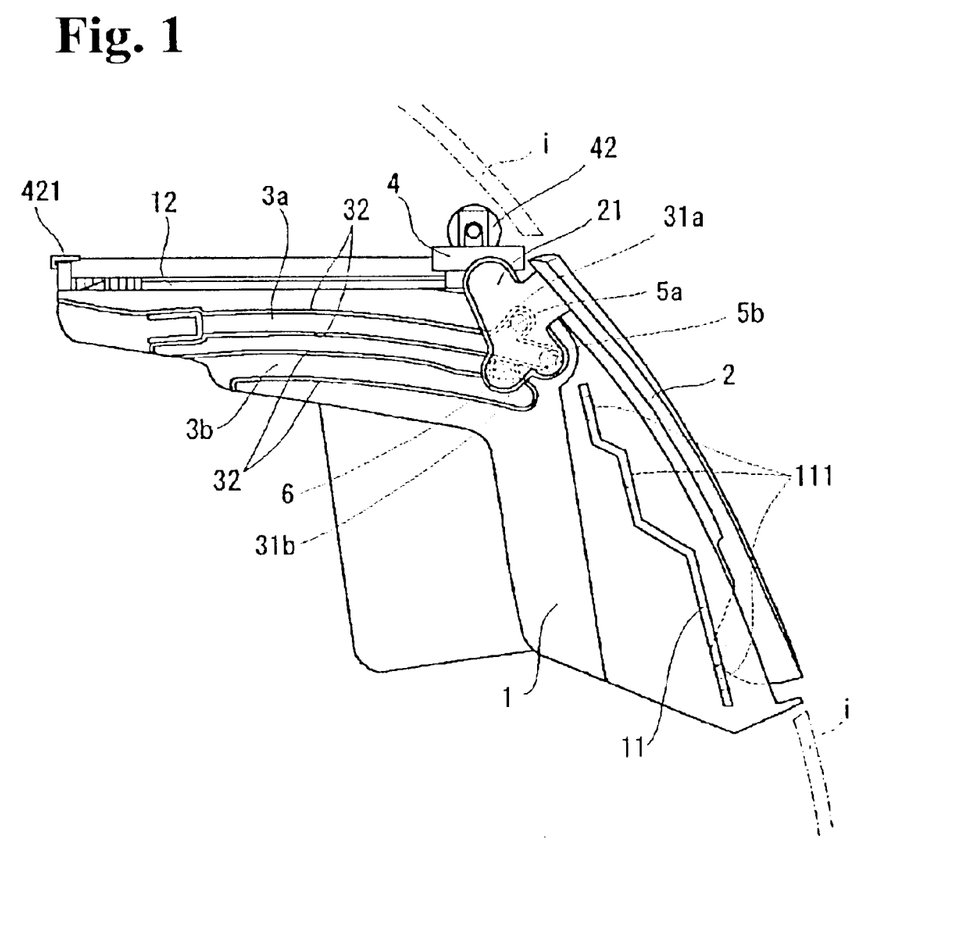
FIG. 1 is a side view showing an interior equipment for an automobile in a closed state as an example in which a covering member opens and closes with an opening-closing mechanism using a guide mechanism of the present invention.
Figure 2:
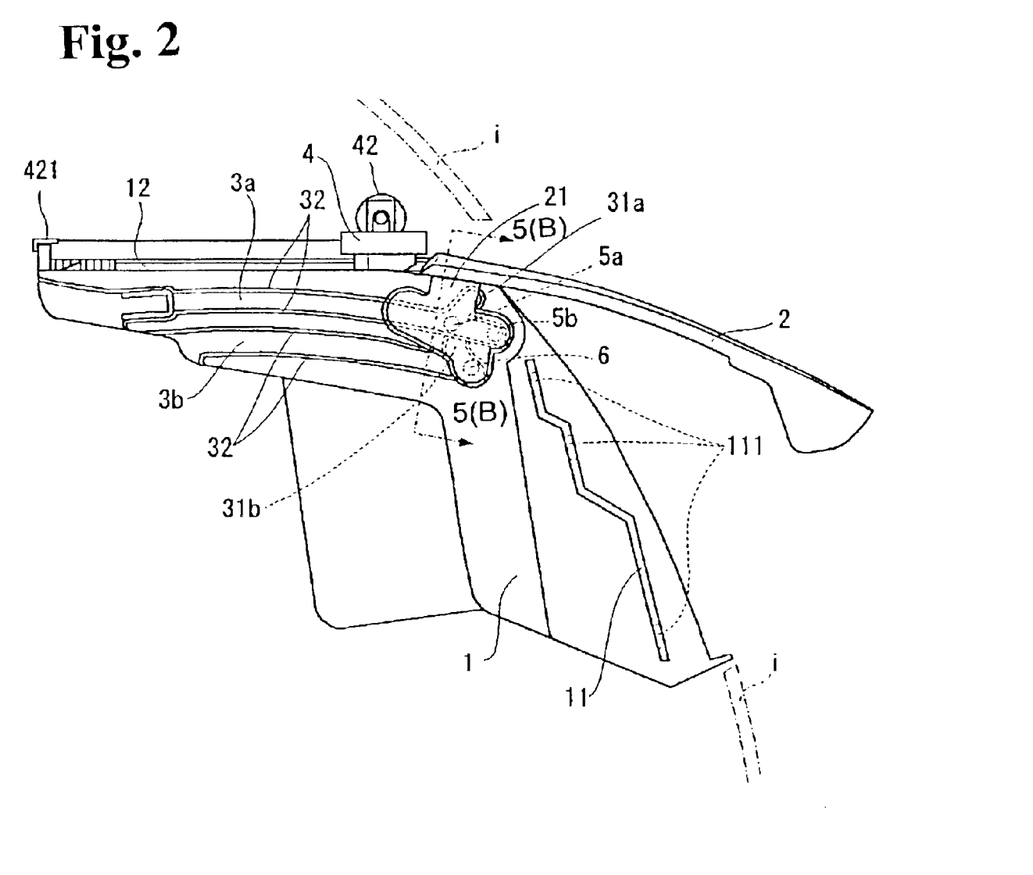
FIG. 2 is a side view showing a state where the covering member of the interior equipment for the automobile turns and opens.
Figure 3:
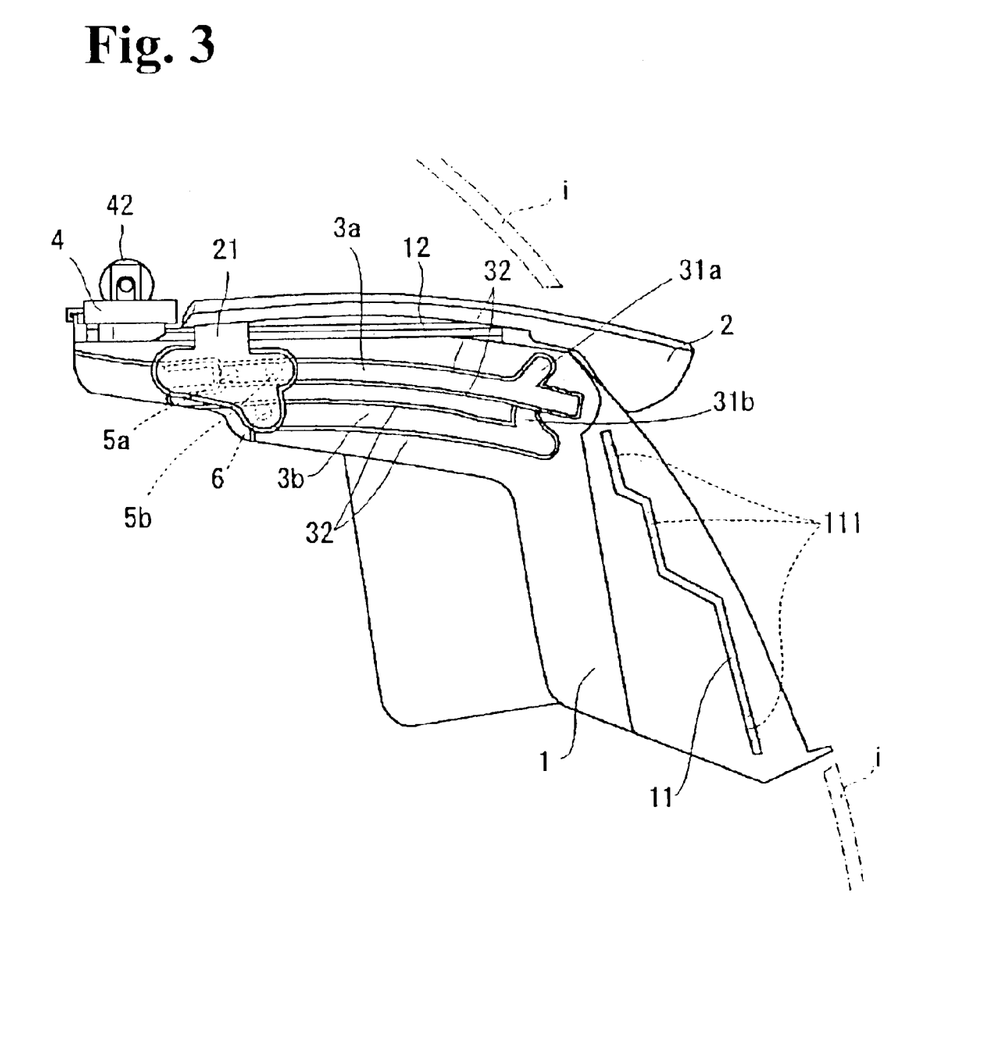
FIG. 3 is a side view showing a state that the covering member of the interior equipment slides to be stored.

The first guiding groove 3*a* and the second guiding groove 3*b* are provided on upper end portions of both side surfaces of the box-type main frame 1, as shown in FIGS. 1–3. The first guiding groove 3*a* includes a circular arc shape branch groove 31*a* disposed at a location slightly backward from a front end thereof. The second guiding groove 3*b* also includes a circular arc shape branch groove 31*b* branched from a front end thereof. In this case, as shown in FIG. 5(B), the first and second guiding grooves 3*a*, 3*b* and the branch grooves 31*a*, 31*b* thereof are structured such that a pair of thin wall members 32 are projected from an outer surface of the side wall of the box-type main frame 1 with a predetermined space therebetween, and a space between the thin wall members 32 is formed as the guide grooves. Incidentally, the pair of the thin wall members 32 constituting both guide grooves 3*a*, 3*b* and branch grooves 31*a*, 31*b* are connected at end portions so that the guiding grooves 3*a*, 3*b* and branch grooves 31*a*, 31*b* between the thin wall members 32 are closed.

Figure 4:
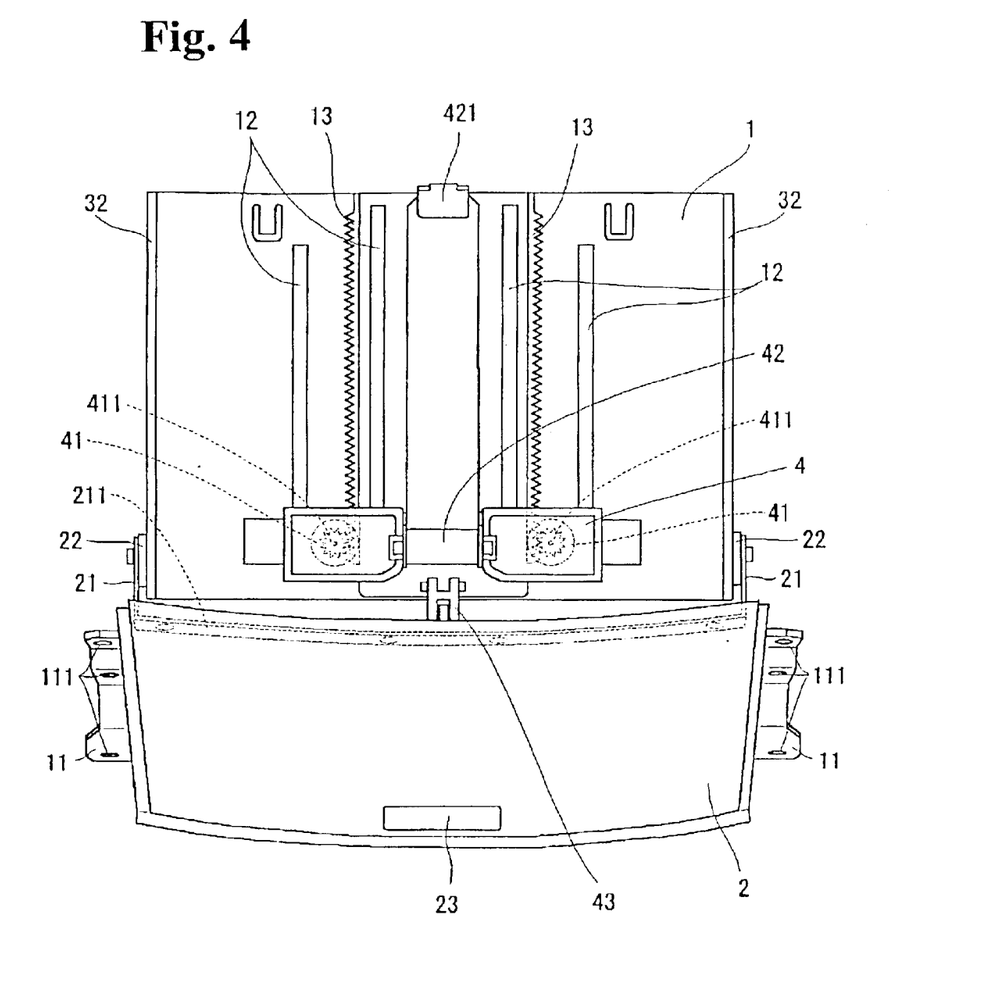
FIG. 4 is a plan view showing the interior equipment for the automobile.

As shown in FIG. 4, four slide rails 12 are formed on the upper surface of the box-type main frame 1 in a front-rear direction. Sliding members 4 are attached on the slide rails 12 to move in the front-rear direction. Also, on the upper surface of the box-type main frame 1, two rack gears 13 are formed to engage pinion gears 411 of oil dampers 41 attached to the sliding members 4. Further, the sliding members 4 are provided with a Conston Spring (driving source) 42. The front end 421 of the Conston spring 42 engages a rear end of the upper surface of the box-type main frame 1 so that the Conston Spring 42 urges the sliding member 4 backward. Furthermore, a connecting member 43 is attached to an edge of the front end at the center of the sliding member 4. An inner surface at a central upper edge of the covering member 2 is rotatably connected to a front end of the connecting member 43.

The covering member 2 is provided with holding members 21 projecting rearward at upper side edges thereof. On an inner surface of the holding member 21, two first guide projections 5*a*, 5*b* to be inserted into the first guide groove 3*a* and the second guide projection 6 to be inserted into the second guide groove 3*b* are formed in a triangle shape.

The covering member 2 is attached to the box-type main frame 1 to sandwich the box-type main frame 1 on side surfaces thereof by the holding members 21. Accordingly, the two first guide projections 5*a*, 5*b* projecting from each holding member 21, are inserted into the first guide groove 3*a*, and the second guide projection 6 is inserted into the second guide groove 3*b*. An inner surface at a central upper edge of the covering member 2 is rotatably attached to the connecting member 43 of the sliding member 4.

Figure 5A:
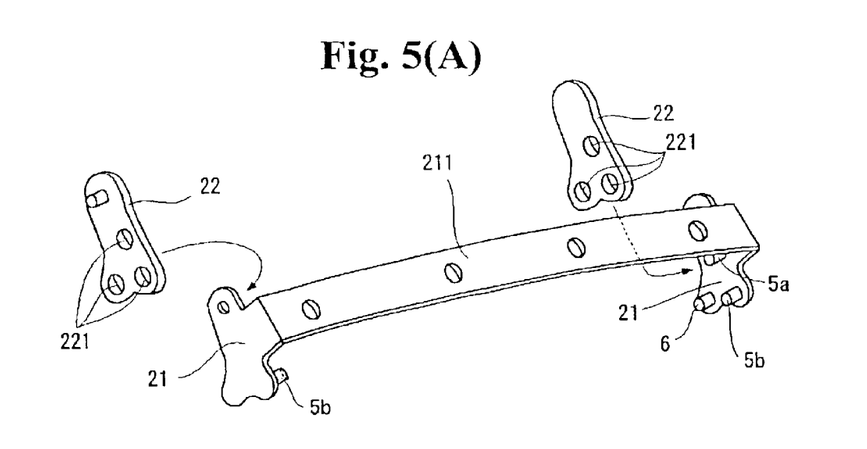
FIG. 5(A) is an exploded perspective view showing components of supporting pieces provided in the covering member of the interior equipment.
Figure 5B:
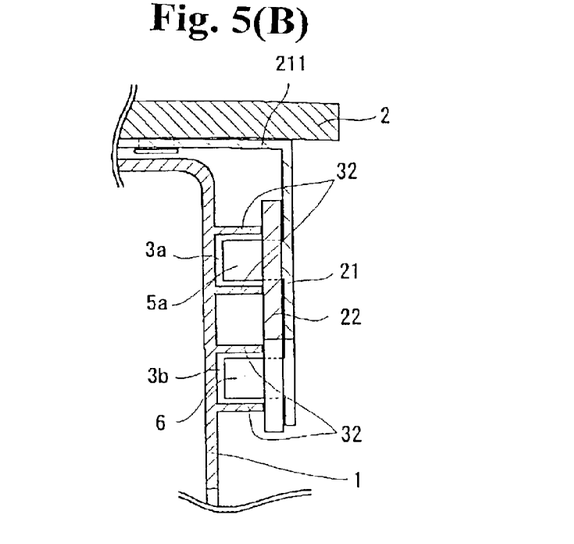
FIG. 5(B) is a cross sectional view taken along line 5(b)—5(b) in FIG. 2.

As shown in FIG. 5(A), the holding members 21 are formed by bending an elastic metal plate 211 in a substantially U-character shape, and the guide projections 5*a*, 5*b*, and 6 are provided on the inner surfaces of both ends, respectively. As shown in FIG. 4, the elastic metal plate 211 is fixed to the upper inner surface of the covering member 2, so that the holding members 21 project from both side edges of the covering member 2.

As shown in FIGS. 5(A) and 5(B), sliding plates 22 made of a material such as a fluorocarbon resin with an excellent sliding quality are attached to the inner surfaces of the supporting members 21. The guide projections 5*a*, 5*b*, and 6 project inwardly through projection through holes 221 disposed in the sliding plates 22.

The supporting members 21 are provided at both ends of the metal plate 211 in a state that the supporting members 21 are bent inside by an angle slightly smaller than the right angle. The metal plate 211 is attached to the box-type main frame 1 in a state that the metal plate 211 is bent slightly outward. That is, the supporting members 21 abut against the side surfaces of the box-type main frame 1 with a predetermined pressure by an elastic force of the metal plate. At this time, as shown in FIG. 5(B), ends of the guide projections 5*a*, 5*b*, and 6 do not contact bottoms of the guide grooves 3*a*, 3*b*, and edges of the thin walls 32 of the guide grooves 3*a* and 3*b* linearly contact the sliding plate 22.

A locking mechanism (not shown) is disposed at a center of a lower edge of the covering member 2 for engaging an edge of the opening of the box-type main frame 1. Through this locking mechanism, the covering member 2 is locked in the closed position where the front opening of the box-type main frame 1 is closed, and the locked state may be unlocked by pushing a lock release button 23 provided at a lower center part of the front face of the covering member 2 (refer to FIG. 4).

Next, operation and movements in opening and closing the covering member 2 of the interior equipment for automobile will be explained.

The interior equipment for the automobile, as described above, is provided with the liquid crystal display panel (not shown) of the car navigation system inside the box-type main frame 1, and is attached to the inside of the instrument panel i of an automobile, as shown in FIGS. 1–3. As shown in FIG. 1, in a usual state (non-use state), the covering member 2 closes the opening of the front end of the box-type main frame 1, and is locked by the locking mechanism (not shown), thereby protecting the liquid crystal display panel (not shown).

At this time, one first guide projection 5*a* and the second guide projection 6 are located at ends of the branch groove 31*a* of the first guide groove 3*a* and the branch groove 31*b* of the second guide groove 3*b*, respectively. The other first guide projection 5*b* is located at a front part of the first guide groove 3*a*.

From this state, when the covering member 2 is opened to expose the liquid crystal display panel to use the car navigation system, the lock release button 23 (refer to FIG. 4) is pressed, so that the locking mechanism releases the covering member 2 from the locked state.

Figure 6A:
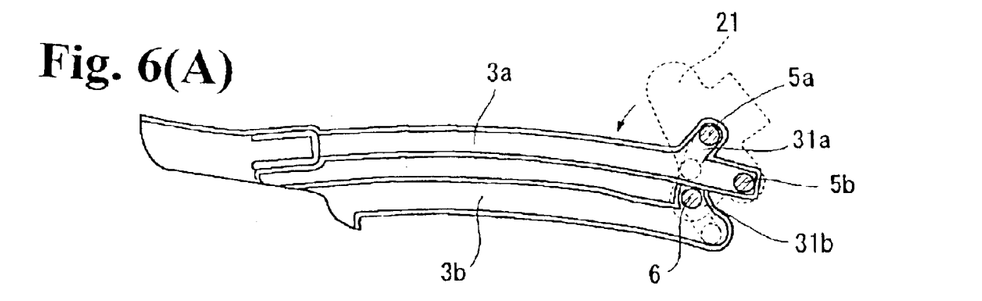
FIGS. 6(A) to 6(D) are sequential drawings for explaining a relation among guide projections and guide grooves when the covering member of the interior equipment for the automobile turns and slides.
Figure 6B:
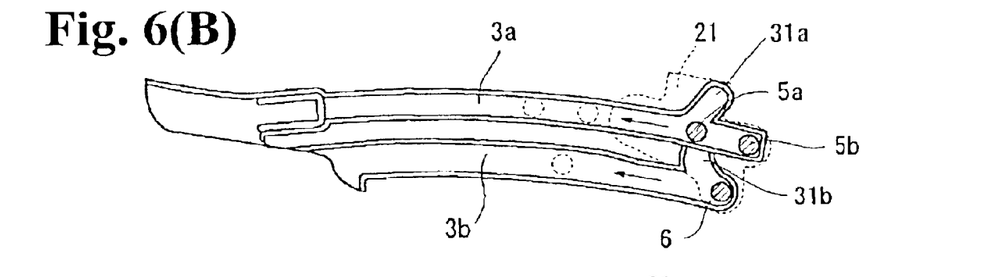

Accordingly, as shown in FIG. 2, the sliding member 4 moves backward with the urging force of the Conston spring 42, and the top edge of the covering member 2 is pulled backward. As shown in FIG. 6(A), the one first guide projection 5*a* and the second guide projection 6 are guided in the branch grooves 31*a* and 31*b*, respectively, and move downward along the arc of the branch grooves 31*a* and 31*b*. Then, as shown in FIG. 6(B), the guide projections move to the first guide groove 3*a* and the second guide groove 3*b*, respectively.

At this time, along with the movements of the first guide projection 5*a* and the second guide projection 6, the covering member 2 turns in the opening direction around the other first guide projection 5b, and as shown in FIG. 2, and the front end of the box-type main frame 1 is opened.

Figure 6C:
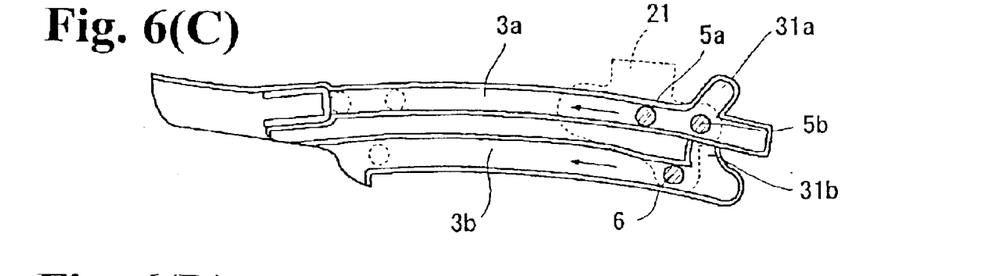
Figure 6D:
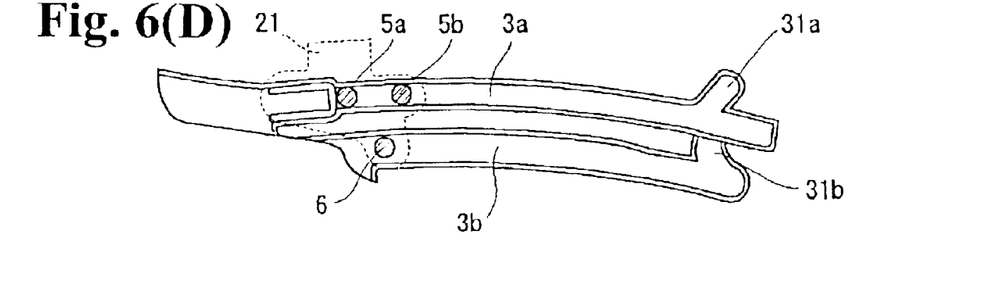

Then, the sliding member 4 is pulled backward again by the Conston spring 42, so that the covering member 2 is pulled backward. As shown in FIGS. 6(C) and 6(D), the first guide projections 5a and 5b are guided to slide backward inside the first guide groove 3a, and the second guide projection 6 is guided to slide backward inside the second guide groove 3b. The covering member 2 slides backward along with the guide projections 5a, 5b, and 6, as shown in FIG. 3, thereby storing the covering member 2 inside the instrument panel i. Accordingly, the front face of the box-type main frame 1 is completely opened, and the liquid crystal display panel (not shown) installed inside the box-type main frame 1 becomes visible.

The sliding and turning motions of opening the covering member 2 is carried out automatically as the sliding member 4 moves backward with the urging force of the Conston spring 42. In this case, the motions are slow due to the oil dampers 41 provided in the sliding member 4 (refer to FIG. 4).

Next, when closing the covering member 2 and returning to the state in FIG. 1 from the state in FIG. 3, the edge of the covering member 2 projecting from the instrument panel i is grasped to pull out the covering member against the urging force of the Conston spring 42. At this time, the first guide projections 5a, 5b are guided to slide forward inside the first guide groove 3a. The second guide projection 6 is guided to slide forward inside the second guide groove 3b. The covering member 2 slides forward along with the guide projections 5a, 5b, and 6, and projects from the instrument panel i as shown in FIG. 2. In this case, at the end of the siding motion, the first guide projection 5b and the second guide projection 6 reach the front ends of the first guide groove 3a and the second guide groove 3b (in the state in FIG. 6(B)), respectively.

After the covering member 2 is pulled out to the end of the sliding motion as described above, the covering member 2 is turned downward against the urging force of the Conston spring 42. The front opening of the box-type main frame 1 is covered with the covering member 2. Then, the inner surface of the lower end of the covering member 2 where the locking mechanism (not shown) is disposed is pushed to fit to the opening of the box-type main frame 1, so that the locking mechanism engages the box-type main frame 1 to lock the covering member 2 in the closed state, i.e. the initial state in FIG. 1.

At this time, the one first guide projection 5a and the second guide projection 6 move into the arc-shaped branch grooves 31a, 31b from the first guide groove 3a and the second guide groove 3b, respectively, and slide inside the branch grooves 31a, 31b to return to the state in FIG. 6(A). The covering member 2 turns in the closing direction around the other first guide projection 5b along with the guide projections 5a and 6 to be closed.

In the present embodiment, as described above, the covering member 2 is attached to the box-type main frame 1 in the state that the holding members 21 are pressed against both side surfaces of the box-type main frame 1 with a predetermined pressure. Therefore, the covering member 2 does not wobble, and the covering member 2 is stably opened or closed while being guided through the guide grooves 3a, 3b and branch grooves 31a, 31b. Also, in this case, the inner surface, i.e. the base surfaces provided with the guide projections 5a, 5b, 6, of the holding member 21 slides in a linear contact with the front ends of the thin wall members 32 constituting the guide grooves 3a, 3b and branch grooves 31a, 31b. Moreover, the inner surface (base surfaces) of the holding member 21 is formed of the sliding plate 22 with good sliding ability (refer to FIG. 5(B)). Therefore, the covering member 2 can be operated extremely smoothly with small sliding resistance.

As described above, according to the present embodiment, in the opening-closing mechanism of the covering member used in the interior equipment installed in a car, each of the guide grooves 3a, 3b (including the branch grooves 31a, 31b), through which the guide projections 5a, 5b, 6 provided in the moving member slide, is formed as a space between the pair of the thin wall members 32 provided in the box-type main frame 1 with a predetermined space therebetween. Thus, the inner surface of the holding member 21 as the base surface, on which the guide projections 5a, 5b, and 6 are provided, linearly contact the edges of the thin wall members constituting the guide grooves. Moreover, since the inner surface of the holding member 21 is formed of the sliding plate 22 having good sliding ability, the covering member 2 as the moving member can be guided smoothly with small sliding resistance.

Further, in order to prevent the wobbling of the covering member 2, the holding members 21 provided with the guide projections 5a, 5b, and 6 are pressed against both side surfaces of the box-type main frame 1 provided with the guide grooves 3a, 3b with a predetermined pressure without increasing the sliding resistance of the holding members 21. Thus, the moving member can be operated smoothly without wobbling.

Incidentally, the guide mechanism, the opening-closing mechanism with the guide mechanism, and the interior equipment installed in a car using the opening-closing mechanism according to the present invention are not limited to the above-described embodiments. The structures and usages of various portions may be modified. For example, in the above embodiment, the guide mechanism guides the covering member of the interior equipment installed in a car having the liquid crystal display panel of the car navigation system to turn and slide to be drawn backward and housed. The mechanism may be a guide mechanism for simply rotating or sliding the covering member. Also, the mechanism may be a guide mechanism for drawing out a cup holder, ashtray, glove compartment or the liquid crystal display panel itself of the car navigation system from an instrumental panel.

Also, in the above embodiment, the covering member 2 as the moving member is provided with the holding members 21 having the guide projects 5a, 5b, and 6. The holding members 21 sandwich the box-type main frame 1 as the supporting base frame from the outer surfaces of both sides so that the guide projections 5a, 5b, and 6 provided at the inner surfaces of the holding members 21 are inserted into the guide grooves 3a, 3b provided at the outer side surfaces of the box-type main frame 1. The structure for inserting the guide projections into the guide grooves is not limited thereto. The structure may be modified according to a movement of the moving member or a relationship between the moving member and the supporting base frame.

For example, guide projections provided at outer side surfaces of the moving member may be inserted into guide grooves provided at inner surfaces of the supporting base frame. Further, in the present embodiment, the sliding plates 22 are attached to the inner surfaces of the holding members 21 to constitute the base surfaces for contacting the edges of the thin wall members 32. However, the sliding plates 22 may be omitted, or the holding members 21 may be made of a material with good slide property. Furthermore, the other structures and usages of the present embodiment may be modified as long as within the scope of the present invention.

As explained above, according to the guide mechanism of the present invention, the moving member supported by the supporting base frame can be operated along a predetermined path smoothly without wobbling. With the guide mechanism, it is possible to operate the opening-closing mechanism of the covering member or interior equipment in the car with the opening-closing mechanism stably and smoothly.

While the invention has been explained with reference to the specific embodiments of the invention, the explanation is illustrative and the invention is limited only by the appended claims.

What is claimed is:

1. A guide mechanism, comprising:

a supporting frame, a guide groove disposed on one side of the supporting frame and formed of a pair of thin wall members projecting from the one side to have a predetermined space therebetween, a moving member movably arranged relative to the supporting frame and having a base portion, and a guide projection projected from the base portion of the moving member and situated in the guide groove without contacting a bottom surface of the guide groove so that the base portion of the moving member contacts edges of the thin wall members linearly.

2. The guide mechanism according to claim 1, wherein said base member of the moving member is made of a material with low frictional resistance.

3. The guide mechanism according to claim 2, further comprising a sliding plate having a through-hole therein, said sliding plate being disposed on the base portion for allowing the projection to pass and project therethrough.

4. The guide mechanism according to claim 1, wherein said base portion has flexibility to be elastically pressed against the edges of the thin wall members.

5. The guide mechanism according to claim 1, wherein said supporting frame includes a pair of side surfaces, each having the guide groove facing outwardly from the support frame; and said moving member includes a pair of holding members, each having said guide projection, said pair of the holding members holding the side surfaces of the supporting base therebetween so that the guide projections disposed on the holding members are situated in the respective guide grooves.

6. The guide mechanism according to claim 5, wherein said moving member further includes an elastic metal plate having two ends bent in a U-character shape to form said pair of the holding members with the projections at the ends, said elastic metal plate being attached to the moving member so that the pair of the holding members at both ends of the elastic metal plate is pressed against the edges of the thin wall members with elastic force of the elastic metal plate.

7. The guide mechanism according to claim 6, wherein each of said side surfaces includes two guide grooves extending parallel to each other, each guide groove being formed of and defined by the thin wall members; and each of the holding members has at least two projections locating in the two guide grooves.

* * * * *